Feb. 7, 1950 S. W. SEELEY 2,496,818

ANGLE MODULATION DETECTOR

Filed Nov. 4, 1947

INVENTOR
STUART W. SEELEY
BY [signature]
ATTORNEY

Patented Feb. 7, 1950 2,496,818

UNITED STATES PATENT OFFICE 2,496,818

ANGLE MODULATION DETECTOR

Stuart William Seeley, Roslyn Heights, N. Y., assignor to Radio Corporation of America, a corporation of Delaware Application November 4, 1947, Serial No. 784,033

17 Claims. (Cl. 250—27)

Figures 1, 2, 3, 4, 5, 6, 7:
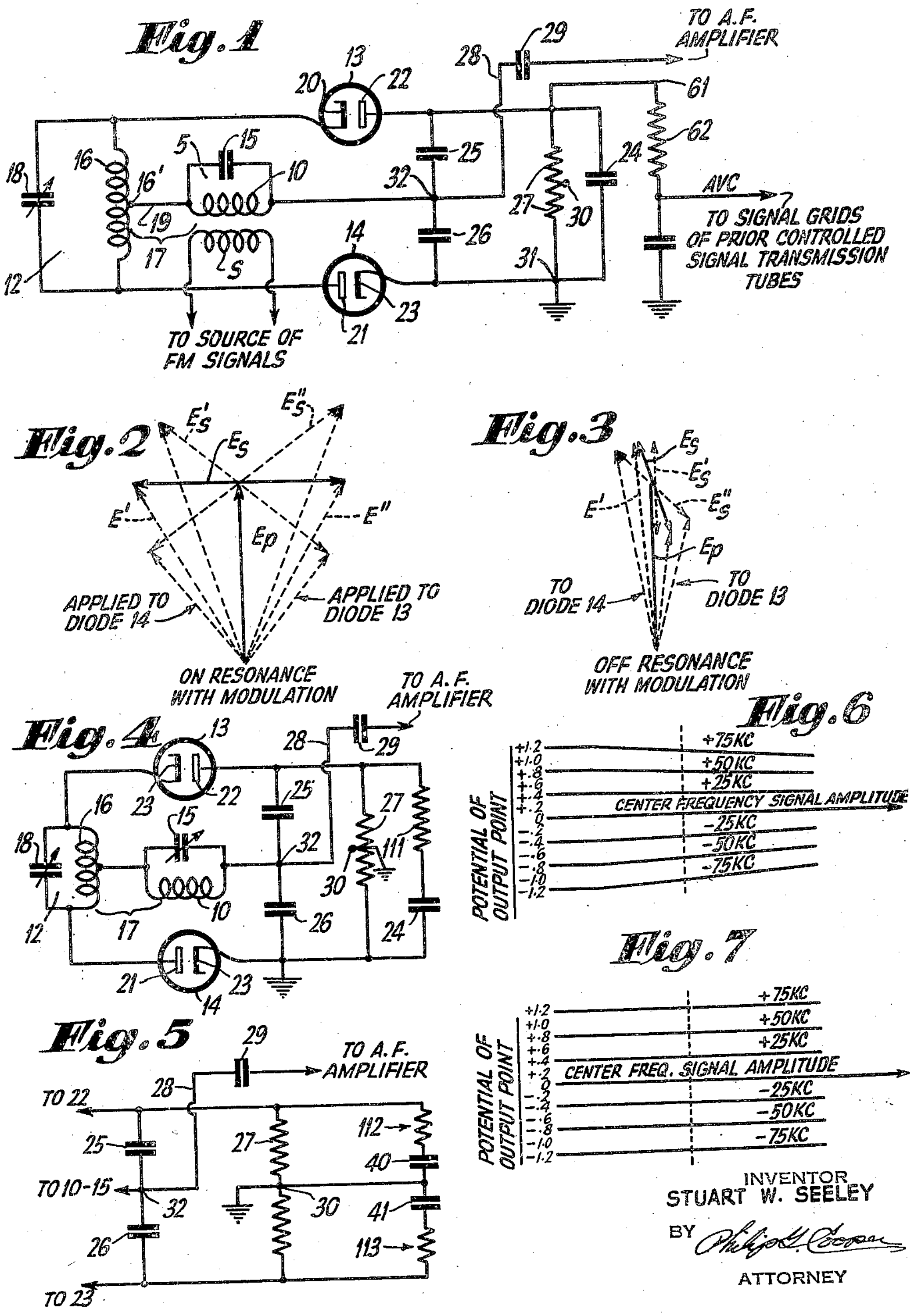

My present invention relates generally to detectors of angle modulated carrier waves which are insensitive to amplitude variations, and more particularly to an improved circuit for deriving the modulation from a frequency modulated (FM), or phase modulated (PM), carrier wave without allowing co-existent amplitude modulation (AM) variations to result in substantial detector output potentials. This application is a continuation-in-part of my parent application Serial No. 614,956 filed September 7, 1945.

In the past there have been provided various methods of detecting angle modulated carrier waves without response to undesired amplitude variations. By "angle modulation" is meant either FM or PM, or hybrid forms of modulation possessing characteristics common to both of them. In the generation, transmission and reception of angle modulated waves such undesired AM effects may come from the transmitter directly, may be due to interfering impulses, or may be caused by lack of uniform gain over the signal selector pass band. In prior detection systems which were inherently immune to such undesired AM effects the means employed was either relatively uneconomical as compared to the cost of a special amplitude limiter stage prior to the detector, or the degree of immunity to undesired AM effects was insufficient.

From one viewpoint of my present invention I have provided an FM detector which produces output only in the presence of a variation in the ratio of the signals applied to the respective diode rectifiers, whereas little or no output results from undesired interfering or "off-tune" signals. Decreased interferences from adjacent channel signals and markedly reduced side responses as the desired FM signal is tuned off resonance, are outstanding features of the present FM detector circuit.

A more specific object of my present invention is to provide an FM ratio detector consisting of a pair of rectifiers having but a single direct current path connecting said rectifiers in series-aiding polarity thereby deriving the benefits to be obtained from maintaining substantially identical direct currents in each of the two rectifiers, there being employed a novel method for controlling the desired percentage of the total rectified voltage which is stabilized to reduce residual balanced amplitude modulation.

More specific objects of my invention will appear in the following detailed description of various embodiments of the basic features, it being pointed out that my present balanced FM detector system, substantially immune to AM effects, has important applicability to FM receiver construction.

Other objects and features of the invention will best be understood by reference to the following description, taken in connection with the drawing, in which I have indicated diagrammatically several circuits whereby my invention may be carried into effect.

Fig. 1 is a schematic circuit diagram of an FM detector or ratio detector;

Figs. 2 and 3 respectively show different vector relations between the primary and secondary voltages of the discriminator input network of the detector;

Figs. 4 and 5 show respectively modifications of the external single direct current in accordance with my present invention; and Figs. 6 and 7 are respectively illustrative of the action of the modifications of Figs. 4 and 5.

Referring now to the accompanying drawing, wherein like reference characters in the several figures designate similar circuit elements, there is shown in Fig. 1 a detector network of an FM receiver of the superheterodyne type. The detector of Fig. 1 is constructed in accordance with my invention disclosed and claimed in my parent application above referred to. While my invention is readily incorporated in any form of receiver of FM waves, I prefer to explain its functioning in connection with a superheterodyne receiver, since such a system is widely used at present. As previously explained, the present invention is not restricted to reception of FM waves, since phase modulated carrier waves could be received as well. An FM wave is produced at the FM transmitter by deviating the carrier wave relative to its mean frequency to an extent proportional to the amplitude of the modulation and independent of the modulating frequency. A PM wave differs in having a frequency deviation which increases with modulating frequency. The generic expression, "angle modulation" is, also, intended to include a modulated wave of preferably constant amplitude wherein the modulation is neither pure FM nor pure PM, but contains components resembling one or both of them, and is, therefore, a hybrid modulation.

In the present application it is assumed, by way of specific example, that the receiver is designed to operate over the present 88 to 108 megacycles FM band or over the former FM broadcast band of 42–50 megacycles (mc.), and that each transmitter radiates an FM wave having a maximum frequency deviation up to ±75 kilocycles (kc.)

with respect to the normal transmitter frequency. These are the assigned frequency values of the present day FM broadcast band, and are used herein merely by way of illustration. The receiver may include any desired form of signal collector, as for example a dipole. The collected FM signal waves may be applied to a suitable converter for reduction of the mean frequency value without change of the deviation. The converter may be of any desired construction, and is preferably preceded by one or more stages of selective high frequency amplification. Suitable signal selector circuits, usually employing a variable condenser or adjustable inductor, are provided for adjustment to receive signals from a desired FM station. The signal selector circuits will, of course, preferably be adjusted accurately to resonate the various adjustable selector circuits to the center, or mean, frequency of the desired FM station.

In a superheterodyne receiver the converter is fed with oscillations from a local oscillator whose tank circuit includes an adjustable reactance device, usually a variable condenser or adjustable inductor. The latter is suitably adjusted concurrently with the aforesaid selector devices so that the tank circuit will be tuned to a local oscillation frequency differing from the desired carrier frequency by the operating intermediate frequency (I. F.). The selective circuits of, and preceding, the converter may on the other hand be of the fixedly tuned type, if desired. The intermediate frequency is usually chosen from a range of 2 to 15 mc., by way of example 8.25 or 10.7 mc. Any suitable actuating mechanism may be used for operating the station selecting devices. The converter may use the well-known pentagrid tube, or it may use separate oscillator and mixer tubes. These various circuits and circuit components are very well known to those skilled in the art of radio communication, and need only be briefly referred to.

The I. F. amplifier network may embody one or more amplifier tubes selectively tuned to the operating I. F. value of 8.25 or 10.7 mc. Of course, all signal transmission circuits between the signal collector and the demodulator, or detector, will be so constructed as to pass efficiently a band at least 150 kc. wide. It is, also, usual to design the signal transmission circuits to have a pass band of approximately 200 kc. in width to provide for reasonable tolerances, such as oscillator frequency drift and the like. The output transformer feeding the final I. F. amplifier tube has its primary and secondary circuit each tuned to the operating I. F. value.

One of the reasons in the past for employing an amplitude limiter prior to the discriminator section (or FM translating network) of the demodulator to reduce undesired AM effects on the carrier wave, was to avoid the necessity for critical tuning to the exact center, or carrier, frequency of a desired FM wave. In my present system there need be no special amplitude limiter stage employed prior to the detector circuit, since the detector itself is substantially immune to amplitude variations of the received FM signals. Hence, the I. F. amplifier tube immediately preceding the detector circuit may possess normal and full gain, which is the reverse of the usual operating condition for an amplitude limiter. Also since no limiter is required, a receiver utilizing the present ratio detector need not have the high I. F. amplifier gain heretofore found necessary in commercial practice in order to assure attainment of a threshold value of signal strength for operation of a limiter.

The discriminator input network of my present FM detector comprises coupled primary and secondary circuits denoted by numerals 5 and 12 respectively. The input coil S is indicated as part of the primary circuit. While any known and suitable discriminator may be utilized to provide the energizing signal voltages for rectifiers 13 and 14, I prefer to explain the present circuit action on the basis of the discriminator circuit of Fig. 1. The discriminator network is generally of the type shown and claimed in my U. S. Patent 2,121,103 granted June 21, 1938. In general, it is desired to employ a network constructed and arranged to derive from angle modulated waves a pair of voltages whose relative amplitudes vary in accordance with the angular deviations of the waves with respect to a predetermined reference condition (whether phase or frequency).

Considering the specific illustrative embodiment of Fig. 1, coil 10 is shunted by condenser 15 to provide a parallel resonant circuit tuned to the operating I. F. Coils S and 10 are wound so as to have a very high coeffient of coupling, and for simplification of the analysis the coefficient of coupling may be considered to be unity. Then, any impedance across one coil will appear unchanged in phase angle across the other, and the impedance appearing across both may be lumped and considered to be across only one. Condenser 15 need not be a physical capacitor as such, but may be the sum of the capacitances appearing across coils S and 10. It is composed of the output capacitance of the prior tube connected to coil S, the diode rectifier capacitances and the various stray capacitances to ground of the circuit elements. In a typical case they totaled 25 mmf. (micro micro farads) effectively connected across coil S.

Coils S and 10 may be considered together as the primary coil, and the secondary coil 16 is coupled to primary coils S, 10 as indicated by numeral 17. The coil 16 is shunted by condenser 18. The resonant secondary circuit 12, including coil 16 and condenser 18 which constitute reactance elements of the discriminator network, is tuned to substantially the resonant frequency of the primary circuit 5. Each of coils S, 10 and 16 may be of the known inductance trimmer type, or capacity tuning may be used. Specifically, iron cores or slugs may be used for adjusting the inductance values of the respective coils S, 10 and 16, if coil 16 is so arranged that varying the slug does not unbalance the two halves of the coil. The high alternating potential side of coil 10 is connected by a lead 19 to midpoint 16' of coil 16 thus establishing the midpoint at the same alternating potential as the high potential side of primary circuit 5.

Rectifiers 13 and 14 are shown, by way of specific example, as electron discharge devices of the diode type. It is to be clearly understood that the diodes may have their electrodes embodied in a common tube envelope, as in the 6H6 type tube. The cathode 20 of diode 13 is connected to the upper terminal, as diagrammatically shown, of condenser 18 and to the upper end of coil 16, whereas the anode 21 of diode 14 is connected to the lower terminal of condenser 18 and to the lower end of coil 16. The anode 22 of diode 13 and the cathode 23 of diode 14 are directly connected by condenser 24. The cathode 23 and the corresponding terminal of condenser 24 are established at ground potential at point 31.

The magnitude of the condenser 24 is chosen so that the anode 22 of diode 13 is at ground potential with respect to modulation frequencies i. e., audio frequency currents, as well as for I. F., currents. Grounding point 31 provides a direct current negative voltage at the anode 22 of diode 13 which may be used for automatic gain control. Alternatively, if desired, point 30, or even the anode 22 of diode 13 may be connected to ground.

The connection 61 and its suitable filter network 62 correspond to like-numbered parts in Fig. 4 of my patent application Serial No. 599,343, filed June 4, 1945. The connection or lead 61 is shown connected to anode 22 and the upper end of resistor 27, and is designated "AVC" to denote that it is an automatic gain, or volume control, lead. This lead is adapted to be connected to the signal grid circuits of controlled signal transmission tubes, which are usually located prior to the detector circuit, and its operating time constant may be of a value conventionally employed in commercial amplitude modulated broadcast receivers. The AVC voltage, which is stabilized by condenser 24 against audio frequency variations, is automatically adjusted to the average signal strength, as more fully explained in my aforesaid application Serial No. 599,343. The tube immediately preceding the discriminator input network of the detector circuit may be a normal I. F. amplifier giving full output except as it may be controlled by the AVC action, as shown in Fig. 4 of my aforesaid application.

The anode 22 of the diode 13 is connected to grounded cathode 23 by a pair of series-arranged condensers 25 and 26. Each of these condensers 25 and 26 has a relatively low impendance to I. F. currents, and they function as I. F. bypass condensers. These condensers may, also, serve to provide the proper amount of de-emphasis in the audio signal if they have the proper reactance to audio frequency currents. The primary coil 10 has its right hand end, or terminal, connected to the junction of condensers 25 and 26. Hence, the right hand terminal of coil 10 is at ground potential for I. F. currents, since the condenser 26 connects it to ground. In other words, condenser 26 provides an R. F. ground connection for the discriminator network. The coil S is assumed to be coupled, as previously de scribed, to primary coil 10 thereby to feed I. F. signals from the FM signal source to primary circuit 5.

It can be seen that the diodes 13 and 14 are arranged in reverse relation relative to the connection in a conventional FM detector circuit of the type employing balanced detector circuit diodes. The detector output circuit is completed by a resistor 27 shunted by condenser 24. The modulation voltage, in this case the desired audio frequency modulation signal voltage, is taken off by connecting lead 28 to the low I. F. potential end of primary coil 10, i. e., the junction 32 of condensers 25 and 26, which act as load impedances across which the modulation frequency voltages are derived, the point 32 having the modulation frequency potential of the circuit on the input side of the rectifiers and the circuit on the output side of the rectifiers being grounded for such voltages. Condenser 29 is an audio frequency coupling condenser, and is inserted in the lead 28 to the input grid of the following audio frequency amplifier tube (not shown). Of course, one or more audio amplifier tubes may be employed, and the amplified audio frequency signals may be reproduced in any suitable manner, as by a loud speaker.

Either point 30 on resistor 27 or point 31 may be grounded, and the audio signal output taken off at point 32 at the junction of condensers 25 and 26. No resistance (direct current) between point 32 and either of points 30 or 31 is necessary. If point 30 is grounded, it may be desirable to use balanced audio bypass condensers 40 and 41 across the resistor 27 as shown in Fig. 5. The junction of the condensers 40 and 41 is connected to point 30.

I have found that if no direct current path is connected from point 32 to either of points 30 or 31, or if the impedance of that path is very high compared to the load resistor 27, the direct current through the two diodes 13 and 14 is forced to be equal regardless of whether the received FM signal is accurately tuned in, or is off-resonance. This action provides substantial noise reduction. My present FM detector circuit has but a single direct current path connecting the diode rectifiers in series-aiding polarity. Thus, resistor 27 is included in such a path. The resistor is shunted by a condenser (capacity 24) which acts to inhibit changes in the voltage drop across resistor 27 at a modulation frequency rate.

The single direct current path mentioned above may be referred to, in other words, as a closed loop for flow of unidirectional currents, such loop being formed by a circuit on the input side of the rectifiers connecting the cathode 20 of rectifier 13 to the anode 21 of rectifier 14, the rectifiers themselves, and a circuit on the output side of the rectifiers connecting anode 22 to cathode 23 and including resistance 27. As shown in Fig. 1, the circuit on the input side of the rectifiers may be said to be constituted by the coil 16 of the discriminator and the connections for impressing voltages from the discriminator on the rectifiers. My invention is not limited to such arrangement of the circuit portion of the closed loop on the input side of the rectifiers, as clearly appears from Fig. 7 of my parent application, in which the direct current connection from cathode 20 of rectifier 13 to anode 21 of rectifier 14 goes through diodes 108 and 109.

Before describing in detail the electrical relations existing in the present FM detector circuit, there will be explained the manner in which the discriminator input network of the detector functions, reference specifically being made to Fig. 2. It is first assumed that the FM signals applied to the primary circuit 5 are instantaneously at the mean or carrier frequency of 8.25 or 10.7 mc. The primary signal energies applied to the two diodes will be of like phase. However, cathode 20 and anode 21 are connected to opposite ends of coil 16. Due to the coupling 17 between tuned circuits 5 and 12, there will be a 90 degree shift between the primary and the secondary circuit voltages when the instantaneous carrier frequency is at the resonant, or center, value.

Accordingly, the secondary signal voltage will be applied to cathode 20 and anode 21 from the respective ends of coil 16 in opposite phase, but in each case in phase quadrature with the primary signal voltage. It follows, therefore, that the resultant signal voltages applied to cathode 20 and anode 21 will be equal at the carrier frequency, and the rectified voltages will be of equal magnitude. In Fig. 2 I have portrayed the vector relations which exist at the instantaneous carrier frequency between the primary voltage $E_p$ and each half of the total secondary voltage $E_s$. The resultant voltages applied to the two diodes are respectively designated by the dashed arrows indicated E' and E''.

If at some later instant the FM signals have a frequency different from the resonant frequency of circuit 12, there will occur a phase shift of the signal energy transmitted through the transformer S, 10, 16 which is greater or less than 90 degrees, depending on the direction and the extent of frequency difference between the instantaneous frequency of the FM signals and the predetermined resonant frequency of the tuned circuits 5 and 12. In Fig. 2 I have shown the vector relations corresponding to such a frequency deviation. It will be seen that the total secondary voltage $E_s$ has undergone an angular shift ($E'_s$) relative to the primary voltage. The resultant voltage E' is now greater than the other resultant voltage E''. This means that there will be applied to the diodes 13 and 14 resultant signal voltages of different magnitudes, and, therefore, the rectified voltages will be of different magnitudes. If the frequency of the FM signals at circuit 5 deviated to the opposite side of center frequency, resulting in the angular position ($E''_s$) for $E_s$ shown by the dashed lines in Fig. 2, then vector E'' would be longer than vector E'. Fig. 2, therefore, shows the way the vector voltages applied to diodes 13 and 14 will vary with modulation.

In Fig. 2, as stated previously, I have shown the manner in which the vector voltages applied to diodes 13 and 14 will vary with modulation. In Fig. 3 I have shown the corresponding vectors of an interfering signal which may be one or two channels removed. Fig. 3, also, represents the vector voltages of a desired signal when tuned to one side of resonance. It will be noted in Fig. 3 that the phase of the secondary vectors has been rotated almost to its extreme, and that frequency modulation in this "off-tune" position of the signal causes little or no change in the relative vector potentials applied to diodes 13 and 14. However, as such an interferering or "off-tune" signal is modulated, it tends to ride up and down on the side of the selectivity curve of the receiver and thereby becomes endowed with a large measure of amplitude modulation. Since, however, the detector described herewith produces output only in the presence of a variation on the ratio of the two applied signals, little or no output from such an interfering or "off-tune" signal results. I have demonstrated this action of the present detector circuit in decreased interferences from adjacent channel signals, and in the markedly reduced side responses as the desired signal is tuned off resonance.

The following illustrative constants are provided for the circuit of Fig. 1, assuming an I. F. of 8.25 or 10.7 mc. These values are in no way restrictive. Coils S and 10 may each be (approximately 15 microhenrys) solenoids wound one on top of the other to get maximum coefficient of coupling.

| | |
|---|---|
| $C_{15}$=25 mmf. (total) | $C_{24}$=8 mf. |
| $C_{18}$=75 mmf. | $L_{16}$=5 microhenrys |
| $C_{25}$, $C_{26}$=0.005 mf. each | $R_{27}$=30,000 ohms |

The values chosen for condensers $C_{25}$ and $C_{26}$ will produce a degree of attenuation of high audio frequencies relative to lower audio frequencies.

The time constant of any network connected between point 32 and the single direct current path, in the absence of conduction in either diode, is preferably long compared to the period of modulation frequencies. Further, the time constant of the network comprising condenser 24, the conductive impedances of the diodes as supplied by the discriminator voltages and the resistance of resistor 27, is long compared to the period of the desired modulation frequencies.

It is not believed necessary to repeat the detailed analysis of the electrical relations existing in the ratio detector circuit of Fig. 1, reference being made to Figs. 3, 4 and 5 and the description thereof in my aforesaid parent application. It is believed sufficient for the purposes of the present application to point out that in the present ratio type of FM detector the problem of making the detector insensitive to amplitude variations of the received frequency-modulated signal has been met by splitting the rectified I. F. voltages into two parts in such a way that the ratio of the rectified voltages is proportional to the ratio of the applied frequency-sensitive I. F. voltages. It follows that if the sum of these rectified voltages is maintained constant by a suitable means and if their ratio remains constant, the individual rectified voltages will also remain constant. The output of the detector will, therefore, tend to be independent of amplitude variations in the input signal.

The rectified voltages aid to produce the sum voltage, which is held constant, and the sum voltage may be stabilized by using a battery, or by shunting a large condenser across the resistor 27. If a battery is used, operation is limited to a signal at least strong enough to overcome the fixed bias created by the battery. On the other hand if a large condenser is used the voltage across the condenser will vary in proportion to the average signal amplitude, and thus automatically adjust itself to the optimum operating level. In this way amplitude rejection can be secured over a wide range of input signals, the lowest signal being determined by deterioration of the rectifier characteristics at low levels. When a condenser is used to stabilize the rectified output voltage its capacitance must be large enough so that the rectified output voltage does not vary substantially at audio frequency. For instance in an FM broadcast receiver operating with a 10.7 mc. value, this calls for a time constant of the order of 0.1 second and for capacitance values of the order of a microfarad.

The manner in which the ratio detector maintains a constant output independent of amplitude modulation may be seen by these considerations. If the amplitude of the input signal is constant then the current flowing into stabilizing condenser current 24 is zero. On the other hand, if the input signal increases, the detector diodes are driven harder and the average diode current increases, and this increased direct current flows into the stabilizing voltage source. Similarly, if the input signal decreases, the diode current decreases, and the stabilizing voltage makes up the decrease in diode current in order to maintain the sum voltage across the diode load resistance constant. Stabilizing the rectified voltage, therefore, results in the equivalent load resistance varying in such a way that it decreases when the input signal rises, and increases when the input signal falls.

This action of the stabilizing voltage in varying the effective diode load resistance provides a convenient method for analyzing the mechanism of amplitude rejection. A first approximation to the behavior of the ratio detector, then, is to consider how the output is affected when the load resistance R is varied above and below its mean operating value.

If $E_1+E_2$ and $E_1-E_2$ are measured, the voltages $E_1$ and $E_2$ being respectively taken across condensers 25 and 2 of Fig. 1, it is readily possible to determine whether the detector constants, the primary-secondary inductance ratio, the primary and secondary Q's, the coupling, the diode perveance and the operating load resistance are such as to yield good amplitude rejection. If the circuit is designed properly, it will be found that as R, the resistance of resistor 27, is varied, $E_1-E_2$ will increase (or decrease) at the same rate as $E_1+E_2$. In other words, $(E_1-E_2)/(E_1+E_2)$ must be independent of R, and, hence, independent of the rectified current. If $(E_1-E_2)/(E_1+E_2)$ is independent of the retified current, then it follows that the ratio $E_1/E_2$ must, also, be independent of the rectified current.

To take a specific example, suppose R is increased so that, for a fixed deviation, $(E_1-E_2)/2$ increases to twice its original value. Then $E_1+E_2$ will, also, double. The input signal may, therefore, be reduced to one half its original value, and the audio output will then be the same as it was before the change in R and the reduction in input signal. In practice, when a battery or a large condenser is used across the resistance (tapped resistor 27), any variation in the input signal automatically causes the equivalent load resistance to vary in such a way as to keep the audio output constant, provided, of course, that the detector circuit parameters are properly related.

The amount of downward amplitude modulation which can be rejected, that is the extent to which the signal can fall below its initial value without causing the output to change, is an important characteristic. The limiting factor here is that if the input signal drops to too low a value, the voltages across the primary and secondary are not sufficient to cause the diodes to conduct. Effectively the diodes are biased off by the stabilizing voltage, and the detector becomes inoperative until the signal rises to a level sufficiently great to cause the diodes to conduct.

It is desirable to design the ratio detector so that the signal can fall to as low a value as possible without the diodes being cut off. This is accomplished, in general, by using a high value of secondary Q and by using relatively low value of diode load resistance so that the operating Q of the secondary is a fraction of its unloaded Q. Other considerations are also involved, but the extent to which the operating Q is smaller than the unloaded Q is the principal factor in determining the maximum percentage of downward amplitude modulation which can be rejected without the diodes being cut off. The limitation of the diodes being biased off by the stabilized rectified voltage does not exist as far as upward modulation is concerned. In general, the ratio detector can reject higher percentages of upward modulation than it can downward modulation.

In Figs. 4 and 5 respectively I have shown FM ratio detectors in accordance with the present invention embodying an arrangement for controlling the desired percentage of the rectified voltage which is stabilized. Fig. 5 is a modification of Fig. 4, and Fig. 4 shows the circuit of Fig. 1 modified in its external voltage maintaining portion. In each of Figs. 4 and 5 resistance has been added in series with the modulation frequency bypass condenser. These resistors, 111 in Fig. 4 and resistors 112 and 113 in Fig. 5, are usually small compared to the resistor 27, and their proper sizes can be determined in accordance with the method described below.

Referring first to Fig. 6, the latter presents a graphical representation of the variation in the potential of the modulation output point 32 with respect to the center or ground point 30 on the resistive element 27 of the single direct current circuit path. These curves can be graphically reproduced on an oscilloscope by applying a sine wave voltage to the horizontal deflection plates, and utilizing that sine wave for 100% amplitude modulation of a carrier signal. This signal is, in turn, applied through an amplifier, if necessary, to the input of any of the angle modulation detection circuits shown herein. Then the vertical plates are connected through a direct current amplifier to the modulation voltage output point 32 of the detector system and the grounded midpoint 30 of the resistance 27. Now if the applied signal, which is being 100% amplitude modulated, is altered in frequency to correspond to the values shown on the graph, the family of curves of Fig. 6 will be reproduced successively on the face of the tube. It will be noticed that these curves converge at the right hand side, or in regions of high amplitude. This is caused by the increased damping of the diodes, when subjected to increased signals, on the phase shift, or secondary, circuit of the discriminator. This increased damping decreases the rotation of the secondary vector voltage, and thereby decreases the difference between the two output voltages whose sum is equal to the so-called source voltage.

If, now, the resistor 111 of Fig. 4, or the resistors 112 and 113 of Fig. 5, are inserted as shown the total source voltage across the resistor-condenser combination in the direct current path is allowed to increase under the stress of increased signals. Thus, even though the damping of the phase shifting circuit is not lessened, the two output voltages are both increased and the difference is correspondingly increased. This tends to maintain the output potential constant for any applied frequency in the presence of amplitude modulation as shown in the curves of Fig. 7. It can readily be seen that if the dashed vertical lines of Fig. 6 and Fig. 7 represented the mean amplitude of an incoming signal whose frequency was being modulated between the limits of +75 kc. and —75 kc., then extraneous amplitude variations would cause extraneous output in an angle modulation detector with the characteristics shown by Fig. 6. However, there would not be caused extraneous output in such a detector when supplied with the aforementioned resistors and whose characteristics are as indicated in Fig. 7.

The value of these series resistors for any given circuit will depend upon many factors, such as the impedance of the discriminator tuned circuits, the degree of coupling between them, the conductive resistance of the diodes, and many others. I have, therefore, found that in practice it is desirable to reproduce the family of curves as shown in Fig. 6 and Fig. 7, and alter the value of the resistor 111, or resistors 112 and 113, until the flat linearity of Fig. 7 results. It will be understood that the modifications shown in Figs. 4 and 5 may be applied to Fig. 1 (or Fig. 7 of my parent application).

Figs. 4, 6 and 7 show a general method for controlling the desired percentage of the rectified voltage which is stabilized. Specifically, a resistor is added in series with the stabilizing condenser. The fraction of the total rectified voltage which must be stabilized to reduce the residual balanced AM is a function of S/P (ratio of secondary input voltage to primary input voltage). If the ratio S/P is such that it is necessary to allow the stabilized rectified voltage to decrease ten per cent, say when the diodes are just at the zero plate current threshold during the negative part of the AM cycle, then the value of resistor 111 should be approximately ten per cent of the total load resistance.

The relative magnitudes of the resultant carrier wave voltages E′ and E″ are a function of the phase deviations of the secondary voltages $E_s$ (or $E_s'$ or $E_s''$) in Fig. 2 with respect to the primary voltages $E_p$, the secondary voltages, together with the primary voltage $E_p$, being impressed on rectifiers 13, 14. The phase deviations of the secondary voltages with respect to the primary voltage are of course dependent upon the angular modulations or upon the frequency of the input wave. The rectifier output circuit includes circuit means, that is, the stabilizing network 24, 27 which will vary the extent of the phase deviations of the secondary voltages $E_s$ with respect to the primary voltage $E_p$ as an inverse function of the amplitude of the input wave. However, with the circuit of Fig. 1 the compensation for variations in amplitude of the applied carrier wave may be too large. In such event this inverse function can be modified or its effect reduced by the provision of resistor 111 of Fig. 4 or resistors 112 and 113 of Fig. 5. It is believed that the above explanation, based on inverse variations of phase sensitivity with amplitude changes in the applied signal, will serve to give a better understanding of the operation of my novel circuits, but I do not restrict myself to any particular explanation of the manner of operation of my invention.

The residual amplitude modulation in the output of a ratio detector, such as shown in Fig. 4, may be divided into "balanced" and "unbalanced" components as a matter of arbitrary convenience. These two residual components are implicit in Figs. 6 and 7 of the present application (Figs. 9A and 9B of the parent application). These figures show the amplitude modulation in the output of a ratio detector. If Figs. 6 and 7 are interpreted in terms of balanced and unbalanced components, the unbalanced component is zero provided the line corresponding to zero deviation is exactly horizontal. This is equivalent to saying that the detector of Fig. 4 (or Fig. 1) is not responsive to AM at the center frequency. The magnitude of the balanced component is indicated by how much the lines corresponding to $\Delta f = +75$ kc. and $\Delta f = -75$ kc. converge towards the zero axis. Reduction of the balanced AM component may be accomplished by allowing the rectified output voltage to vary somewhat during the AM cycle.

While I have indicated and described several systems for carrying my invention into effect, it will be apparent to one skilled in the art that my invention is by no means limited to the particular organizations shown and described, but that many modifications may be made without departing from the scope of my invention.

What I claim is:

1. In combination with a source of angle modulated carrier waves, means for deriving from the waves a pair of signal voltages whose relative magnitudes are dependent upon the angular modulations of the waves, at least two rectifiers, means for applying each of said pair of voltages to a respective rectifier, a single direct current path which carries substantially all the unidirectional current which flows through either rectifier, means for stabilizing the rectified output voltage, and means in circuit with said path for controlling the desired percentage of the rectified output voltage which is stabilized.

2. In combination with a source of angle modulated carrier waves, means for deriving from the waves a pair of signal voltages whose relative magnitudes are dependent upon the angular modulations of the waves, at least two rectifiers, means for applying each of said pair of voltages to a respective rectifier, a single direct current path which carries substantially all the unidirectional current which flows through either rectifier, means for deriving the modulation voltage from across at least one of the rectifiers, means for stabilizing the rectified output voltage, and means in circuit with the stabilizing means for controlling the effect thereof.

3. In combination, a source of frequency modulation signals, a discriminator therefor, a pair of diode rectifiers, means connecting the anode of one rectifier and cathode of the second to predetermined points of said discriminator, a stabilizing condenser of low impedance to modulation frequency currents connecting the cathode of said one rectifier to the anode of the second rectifier, a pair of series-connected condensers in shunt to said stabilizing condenser, said pair of condensers having low impedance to signal currents, said discriminator having a connection to the junction of said pair of condensers, means for deriving modulation voltage from said junction of the pair of condensers, a resistor in shunt with said pair of condensers, and means in circuit with said stabilizing condenser to control the desired percentage of the rectified voltage which is stabilized.

4. In combination, a source of frequency modulation waves, a discriminator therefor, a pair of diode rectifiers, means connecting the anode of one rectifier and cathode of the second to predetermined spaced points of said discriminator, a condenser of low impedance to modulation frequency currents connecting the cathode of said one rectifier to the anode of the second rectifier, a resistor in shunt with the condenser, a second condenser of low impedance to said waves connected from a point on said discriminator to one side of said first condenser, means for deriving modulation voltage from across the second condenser, and resistive means of predetermined magnitude in a series circuit with the first condenser.

5. A frequency modulation detector comprising a pair of rectifiers each having at least two electrodes, a discriminator for obtaining from a source of frequency-modulated waves two voltages dependent upon the frequency modulations of said waves, said discriminator comprising a circuit including inductance and capacity and tuned substantially to the center frequency of said waves, wiring connections to an electrode of each of said rectifiers for impressing each of said voltages on a respective one of the rectifiers, resistance means connected between the other electrodes of the rectifiers, said resistance means being grounded at an intermediate point thereof, capacitive means connected across said resistance means for establishing the potential thereacross against substantial variation at modulation frequencies, two additional condensers connected in series across said other electrodes of said rectifiers and in parallel with said resistance means, a connection from said tuned circuit to a point between the last-mentioned condensers, connections for taking off voltage variations of modulation frequency from said point between said last-mentioned condensers, and means in circuit with said capacitive means for controlling the effect of the latter so far as its stabilizing function is concerned.

6. A frequency modulation detector comprising a pair of rectifiers each having at least two electrodes, a discriminator for obtaining from a source of frequency-modulated waves two voltages dependent upon the frequency modulations of said waves, said discriminator comprising a circuit including inductance and capacity and tuned substantially to the center frequency of said waves, wiring connections for impressing one of said voltages directly on the anode of one of said rectifiers and the other of said voltages directly on the cathode of the other rectifier, a resistor connected between the other electrodes of the rectifiers and having one of its terminals grounded, a condenser across said resistor for establishing the potential thereacross against substantial variation at modulation frequencies, two condensers connected in series across said other electrodes of said rectifiers and in parallel with said resistor, one terminal of one of said last-mentioned condensers being connected to the grounded end of said resistor and the other terminal of said last-mentioned condenser being connected to substantially the mid-point of the inductance in said tuned circuit, whereby said last-mentioned condenser acts to ground the tuned circuit for frequency-modulated waves, connections for taking off voltage variations of modulation frequency from across the connection between the mid-point of the discriminator inductance and ground, and a further resistor in series with said first condenser.

7. In a detector for frequency modulated waves comprising a discriminator network for deriving from frequency modulated carrier waves a pair of signal voltages whose relative magnitudes are dependent upon the frequency modulations of said waves, a pair of rectifiers each having at least an anode and a cathode, connections for applying each of said pair of voltages to a respective rectifier, said connections and said discriminator network providing a circuit connecting the anode of one rectifier to the cathode of the other, a second circuit connecting the cathode of the first-mentioned rectifier to the anode of the second-mentioned rectifier, a resistance in said second circuit, a condenser of large capacity for establishing across said resisistance a direct current potential substantially fixed against modulation frequency variations; the improvement which consists in means connecting said circuits in series with said rectifiers in a closed loop for flow of uni-directional currents in which all of the direct current which passes through either of the rectifiers also passes through the other rectifier, two additional condensers connected in series between the cathode of the first-mentioned rectifier and the anode of the second-mentioned rectifier, means connecting the discriminator network circuit to a point between said last-mentioned condensers, said last-mentioned condensers providing a load impedance connected between said circuits across which may be derived modulation-frequency voltage variations developed on one of said circuits in relation to the other, said large capacity condenser having connected thereto means for controlling its stabilizing effect.

8. In combination with a source of angle modulated carrier waves, a discriminator arrangement of reactance elements for deriving from the waves a pair of signal voltages whose relative magnitudes are dependent upon the modulations of said waves, a pair of rectifiers each having at least an anode and a cathode, connections for applying each of said pair of voltages to a respective rectifier, a circuit connecting the anode of one rectifier to the cathode of the other, a second circuit connecting the cathode of the first-mentioned rectifier to the anode of the second-mentioned rectifier, said circuits in series with said rectifiers constituting a closed loop for flow of uni-directional currents, a resistor in said second circuit, a condenser of large capacity connected across said resistor for establishing and maintaining direct current potential substantially fixed against modulation frequency variations, additional condensers connected in series across the terminals of said second circuit and in parallel with said resistor, said last-mentioned condensers being of such value as to have negligible impedance to the angle modulated carrier waves and to attenuate the high modulation frequencies more than lower modulation frequencies, a connection from a point between said condensers and said discriminator arrangement from which modulation-frequency voltage variations may be derived, and a further resistor of a predetermined magnitude in series with said large capacity condenser for controlling the stabilizing function thereof.

9. In combination with a source of frequency modulated carrier waves, means for deriving from the waves a pair of signal voltages whose relative magnitudes depend upon the frequency modulations of said waves, a pair of rectifiers each having at least an anode and a cathode, means for applying each of said pair of voltages to a respective rectifier, a circuit connecting the anode of one rectifier to the cathode of the other, a second circuit connecting the cathode of the first-mentioned rectifier to the anode of the second-mentioned rectifier, said circuits in series with said rectifiers constituting a closed loop for flow of uni-directional currents in which all of the direct current which passes through either of the rectifiers also passes through the other rectifier, a resistance element in one of said circuits, means for establishing across said resistance element a direct current potential substantially fixed against modulation frequency variations, means connected between said circuits for deriving therefrom modulation-frequency voltage variations developed on one of said circuits in relation to the other, and additional means in circuit with said establishing means for controlling the stabilizing effect of the latter.

10. In combination with a source of angle modulated carrier waves, a discriminator network for deriving from the waves a pair of carrier wave voltages whose relative magnitudes are a function of phase deviations dependent upon said angular modulations, a pair of rectifiers, circuit connections between said discriminator network and said rectifiers for impressing said voltages on respective ones of said rectifiers, a rectifier output circuit coupled to said rectifiers and including circuit means for varying the extent of said phase deviations as an inverse function of the amplitude of said waves, and additional impedance means included in said rectifier output circuit for modifying said inverse function.

11. In combination with a source of angle modulated carrier waves, a discriminator network for deriving from the waves a pair of carrier wave voltages whose relative magnitudes are a function of phase deviations dependent upon said angular modulations, two rectifiers, circuit connections between said discriminator network and said rectifiers for impressing said voltages on respective ones of said rectifiers, a circuit coupled to said rectifiers for varying the extent of said phase deviations as an inverse function of the amplitude of said waves, further circuit means coupled to at least one of said rectifiers for deriving the modulation signal, and additional impedance means included in said circuit for modifying said inverse function.

12. In combination with a source of frequency modulated carrier waves, a discriminator network for deriving from the waves a pair of carrier wave voltages whose relative magnitudes are a function of phase deviations dependent upon said frequency modulations, at least two rectifiers, circuit connections between said discriminator network and said rectifiers for impressing said voltages on respective ones of said rectifiers, a rectifier output circuit coupled to said rectifiers and including circuit means for varying the extent of said phase deviations as an inverse function of the amplitude of said waves, and additional impedance means serially connected in said rectifier output circuit for reducing the effect of said inverse function.

13. In combination with a source of frequency modulated carrier waves, a discriminator network for deriving from the waves a pair of carrier wave voltages whose relative magnitudes are a function of the frequency of said waves, a pair of rectifiers, circuit connections between said network and said rectifiers for impressing said voltages on respective ones of said rectifiers, a circuit coupled to said rectifiers for varying said function inversely with the amplitude of said waves, and additional impedance means included in said circuit for modifying said inverse action.

14. In combination with a source of frequency modulated carrier waves, a discriminator network for deriving from the waves a pair of carrier wave voltages whose relative magnitudes are a function of the frequency of said waves, two rectifiers, circuit connections between said network and said rectifiers for impressing said voltages on respective ones of said rectifiers, a stabilizing circuit coupled to said rectifiers for varying said function inversely with the amplitude of said waves, an output circuit coupled to said rectifiers for deriving the modulation signal, and an additional impedance element included in said stabilizing circuit for modifying said inverse action.

15. In combination with a source of angle modulated carrier waves, a discriminator network for deriving from the waves a pair of carrier wave voltages whose relative magnitudes are dependent upon the angular modulations of the waves, two rectifiers, circuit connections between said discriminator network and said rectifiers for impressing said voltages on respective ones of said rectifiers, a rectifier output circuit coupled to said rectifiers and including a stabilizing network having a time constant that is longer than the duration of a cycle of the modulation signal, thereby to stabilize the rectified output voltage with respect to variations of the amplitude of the waves, and an impedance element coupled to said stabilizing network for modifying the stabilizing effect thereof.

16. In combination with a source of angle modulated carrier waves, a discriminator network for deriving from the waves a pair of carrier wave voltages whose relative magnitudes are dependent upon the angular modulations of the waves, two rectifiers, circuit connections between said discriminator network and said rectifiers for impressing said voltages on respective ones of said rectifiers, a rectifier output circuit coupled to said rectifiers and including a stabilizing network having a time constant that is longer than the duration of a cycle of the modulation signal, thereby to stabilize the rectified output voltage with respect to variations of the amplitude of the waves, said rectifier output circuit having circuit connections for deriving the modulation signal, and an impedance element serially connected in said stabilizing network for reducing the stabilizing effect thereof.

17. In combination with a source of frequency modulated carrier waves, a discriminator network for deriving from the waves a pair of carrier wave voltages whose relative magnitudes are dependent upon the frequency modulations of the waves, two rectifiers, circuit connections between said discriminator network and said rectifiers for impressing said voltages on respective ones of said rectifiers, a rectifier output circuit coupled to said rectifiers and including a stabilizing network having a time constant that is longer than the duration of a cycle of the modulation signal, thereby to stabilize the rectified output voltage with respect to variations of the amplitude of the waves, and a resistive impedance element included in said stabilizing network for reducing the portion of the rectified output voltage which is stabilized.

STUART WILLIAM SEELEY.

REFERENCES CITED

The following references are of record in the file of this patent:

UNITED STATES PATENTS

| Number | Name | Date |
|---|---|---|
| 2,173,231 | Koch | Sept. 19, 1939 |

FOREIGN PATENTS

| Number | Country | Date |
|---|---|---|
| 552,807 | Great Britain | Apr. 27, 1943 |